T. J. HUGHES.
SWIVEL.
APPLICATION FILED JAN. 27, 1920.
1,372,696.
Patented Mar. 29, 1921.
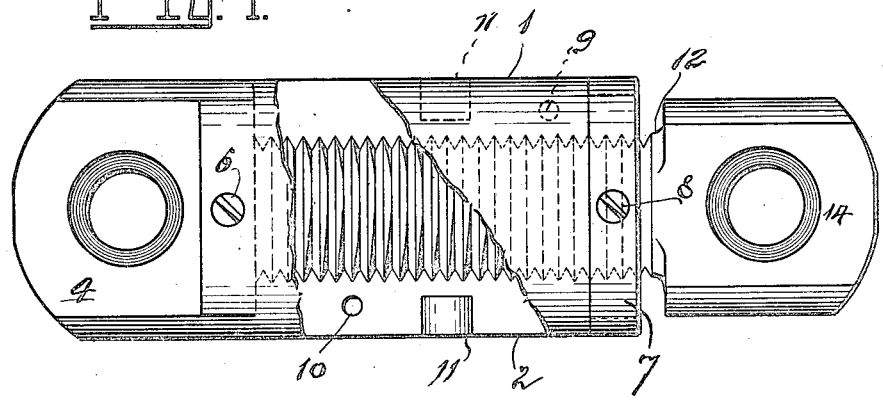
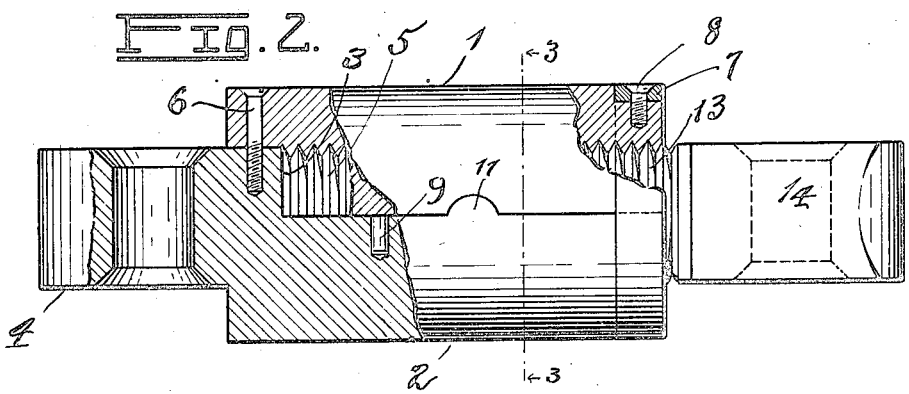
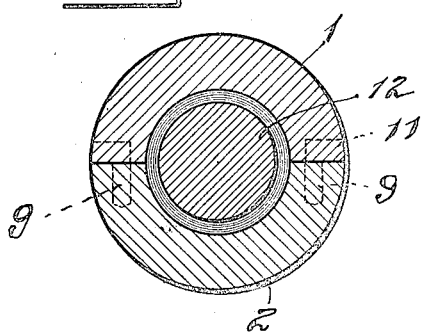
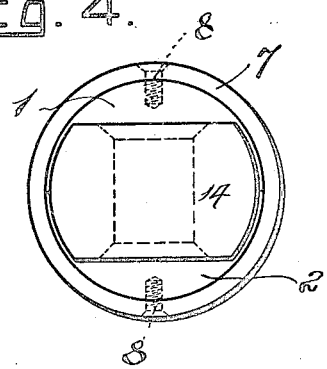
Inventor
Thomas J. Hughes.
By his Attorney
Mason, Fenwick & Lawrence

UNITED STATES PATENT OFFICE.

THOMAS J. HUGHES, OF SEATTLE, WASHINGTON, ASSIGNOR OF ONE-HALF TO SAMUEL J. HUMES, OF SEATTLE, WASHINGTON.

SWIVEL.

1,372,696.　　　　　Specification of Letters Patent.　　Patented Mar. 29, 1921.

Application filed January 27, 1920. Serial No. 354,498.

*To all whom it may concern:*

Be it known that I, THOMAS J. HUGHES, a citizen of United States, residing at 3146 35th Ave. S., Seattle, in the county of King and State of Washington, have invented certain new and useful Improvements in Swivels; and I do hereby declare the following to be a full, clear, and exact description of the invention, such as will enable others skilled in the art to which it appertains to make and use the same.

This invention is an improved swivel connector adapted to resist heavy longitudinal strain without impairing the ease and freedom of the swiveling movement.

An object of the invention is to produce a swivel of great strength and free swiveling action.

Another object is to produce a swivel of compact form without exposed nuts, riveted heads, open links, or the like liable to entangle flexible objects, to choke with dirt or rubbish, or catch and hang on projections encountered when the swivel and connector is dragged about.

The device is particularly useful in logging operations where swivels attached to cables are dragged over the earth through brush, chips and rubbish and if provided with open links or exposed bolt heads would become quickly clogged and refuse to function properly as swivels.

In the accompanying drawings:

Figure 1 is a view of the swivel connector with a part broken away to disclose the structure of the swivel joint.

Fig. 2 is a view taken 90° from the position shown in Fig. 1 of the same parts partly in section.

Fig. 3 is a cross section taken on the line 3—3 of Fig. 2.

Fig. 4 is an end elevation of the right hand end of the connector as viewed in Figs. 1 and 2.

Similar reference characters indicate similar parts in each of the several views.

The female member of the swivel consists of two parti-cylindrical members 1 and 2 divided on a diametrical plane and each having a semicylindrical opening so that when the two parts are placed together face to face they form or constitute a complete cylinder having a cylindrical bore therein, this bore being open from one end only. The inner end of the bore is closed by the shoulder 3 of the member 2. Projecting from one end of the member 3 is the eye-member 4. This eye-member 4 is flattened on opposite sides but equals in width the full diameter of the cylinder. The bore, formed centrally of the members 1 and 2, has its wall consisting of annular ribs 5, said ribs being shown as triangular in cross section. The member 1 is secured at one end to the member 2 by the screw bolt 6; said members are united at their other ends by a ring 7 sleeved over a reduced portion on each of the members 1 and 2. Ring 7 is secured to both members 1 and 2 by screw bolts 8. The members 1 and 2 are further held in registration by means of dowel pins 9 carried on one of the members and projecting into holes 10 formed in the other member and also by opposite semi-cylindrical lugs 11 carried on one of the members (the member 2 as shown in Fig. 2) fitted to correspondingly shaped depressions in the opposing member 1. Thus, the two parts 1 and 2 may be assembled in absolute registration and the ends of the ribs 5 lining the bore of the two mating members will accurately register.

The shank of the male member 12 is provided with annular ridges, ribs or flanges 13, the counterpart in all respects of the annular ridges, ribs or flanges 5 of the hollow member. The ridges of the shank fit in grooves between the ridges of the hollow member and the shank is free to swivel or rotate within said hollow member.

The numerous circular ridges and grooves, interlocking with each other in the manner shown, constitute a construction of great strength to resist longitudinal pulls, and the friction being divided between a large number of surfaces, allows for easy swiveling movement.

The male member 12 is provided with an eye member 14 that corresponds in form with the eye member 4 on the female member excepting that it is slightly narrower in order to allow the ring 7 to be passed over it to permit assembling of the swivel.

The construction is free from parts liable to catch grass, twigs, dirt, or the like, and interfere with the swiveling action. It is compact, strong, and well adapted for the uses for which it was intended.

Having described my invention, what I claim is:

1. A swivel connector comprising a sleeve split into two parts longitudinally, a shoulder formed on one of said parts to close the sleeve at one end, a series of annular grooves and ridges in the inner walls of the sleeve sections, means for holding the two parts of the sleeve together and a bolt member having a series of external annular grooves and ridges meshed into the corresponding ridges and grooves in the sleeve parts.

2. A swivel connector comprising a sleeve split into two parts longitudinally, a shoulder formed on one of said parts for closing the sleeve at one end, means for retaining said parts in registration, including dowel pins carried by one of said parts and the other part provided with holes to receive said dowel pins, annular ridges and grooves in the inner walls of the sleeve sections, and a bolt member having external ridges and grooves meshed into the corresponding ridges and grooves in the sleeve parts.

3. A swivel connector comprising a sleeve split into two parts longitudinally, means for retaining said parts in registration, including dowel pins carried by one of said parts and the other part provided with holes to receive said dowel pins, annular ridges and grooves in the inner walls of the sleeve sections, and a bolt member having external ridges and grooves meshed into the corresponding ridges and grooves in the sleeve parts.

4. A swivel connector comprising a sleeve split into two parts longitudinally, a shoulder formed on one of said parts to close the sleeve at one end, a series of annular grooves and ridges on the inner walls of the sleeve sections, and a bolt member having a series of external annular grooves and ridges meshed into the corresponding ridges and grooves in the sleeve parts.

In testimony whereof I affix my signature.

THOMAS J. HUGHES.